United States Patent
Suzuki et al.

(10) Patent No.: US 6,834,698 B2
(45) Date of Patent: Dec. 28, 2004

(54) PNEUMATIC RADIAL TIRE

(75) Inventors: Kazuya Suzuki, Kobe (JP); Kyoko Sasaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/984,893

(22) Filed: Oct. 31, 2001

(65) Prior Publication Data

US 2002/0074072 A1 Jun. 20, 2002

(30) Foreign Application Priority Data

Oct. 31, 2000 (JP) ........................................ 2000-333093

(51) Int. Cl.[7] ........................... B60C 15/00; B60C 15/06
(52) U.S. Cl. ....................... 152/539; 152/541; 152/542; 152/552; 152/554; 152/546
(58) Field of Search ................................ 152/539, 541, 152/542, 543, 546, 550, 552, 553, 554, 555

(56) References Cited

U.S. PATENT DOCUMENTS

| | | | |
|---|---|---|---|
| 2,971,553 A | | 2/1961 | Woodall |
| 4,295,511 A | * | 10/1981 | Mezzanotte et al. ........ 152/555 |
| 4,896,709 A | * | 1/1990 | Alie et al. ................... 152/543 |
| 5,111,865 A | * | 5/1992 | Shinmura .................... 152/542 |
| 5,538,572 A | * | 7/1996 | Sakamoto et al. .......... 156/123 |

FOREIGN PATENT DOCUMENTS

| | | | |
|---|---|---|---|
| EP | 0 595 653 A1 | | 5/1994 |
| FR | 2 615 453 | | 11/1988 |
| JP | 58-4610 | * | 1/1983 |
| JP | 2-334410 | * | 2/1990 |

OTHER PUBLICATIONS

Mechanics of Pneumatic Tires, ed. Samuel Clark. Washington D.C., US Department of Commerce, 1971, p 373.*

* cited by examiner

Primary Examiner—Blaine Copenheaver
Assistant Examiner—Justin Fischer
(74) Attorney, Agent, or Firm—Birch, Stewart, Kolasch & Birch, LLP

(57) ABSTRACT

A pneumatic radial tire comprising a carcass, a belt layer, and a bead apex rubber. The carcass includes an inner carcass ply and an outer carcass ply that passes outside of the inner carcass. The bead portions are provided with a U-shaped first bead reinforcing layer and a second bead reinforcing layer. And the tire is suitable for use as a high performance tire being capable of improving initial response characteristics at the time of steering and of achieving cuts in running times.

4 Claims, 6 Drawing Sheets

PNEUMATIC RADIAL TIRE

BACKGROUND OF THE INVENTION

The present invention relates to a pneumatic radial tire suitable for use as a high performance tire particularly aimed to run on circuits and being capable of improving initial response characteristics at the time of steering and of achieving cuts in running times by restricting deformation owing to torsion at bead portions thereof.

DESCRIPTION OF THE PRIOR ART

In a high performance tire aimed for high speed running such as running on circuits, a 1—1 structure is often employed for the purpose of improving lateral rigidity and of securing cornering force wherein a carcass A is formed of an inner carcass ply A1 (so-called inner ply) that is fold up from inside to outside around a bead core B and an outer carcass ply A2 (so-called outer ply) that is overlapped with and connected to the fold-up portion A1a of the inner carcass ply A1 by being extending inwardly to the outside of the bead core B as schematically illustrated in FIG. 6.

Since the inner and outer carcass plies A1, A2 enwrap therein the bead core B and a bead apex rubber C to form a shell structure in such a 1—1 structure, movements of side wall portions can be advantageously restricted to improve the lateral rigidity.

However, even such a tire of improved lateral rigidity is not enough to improve response delays of a vehicle when its steering wheel is initially operated, and is not enough to cut the running time to the extent expected.

The inventor supposed that deformation owing to torsion of the bead portions in an initial stage of steering is a large factor thereof. More particularly, while movements are transmitted at the time of steering from a wheel rim to the bead portions, from the bead portions to the side wall portion, and from the side wall portion to a tread portion in this order, it is assumed that occurrence of torsional deformation of a pulled portion of the bead portions or bead cores at the initial stage of steering, causes a delay in transmission of movements to the tires.

SUMMARY OF THE INVENTION

It is therefore an object of the present invention to provide a pneumatic radial tire capable of achieving cuts in running time by basically providing first and second bead reinforcing layers at bead portions of a tire having a carcass of 1—1 structure to thereby restrict deformation owing to torsion in the bead portions and to improve initial response characteristics at the time of steering.

BRIEF EXPLANATIONS OF THE DRAWINGS

Figure 5:
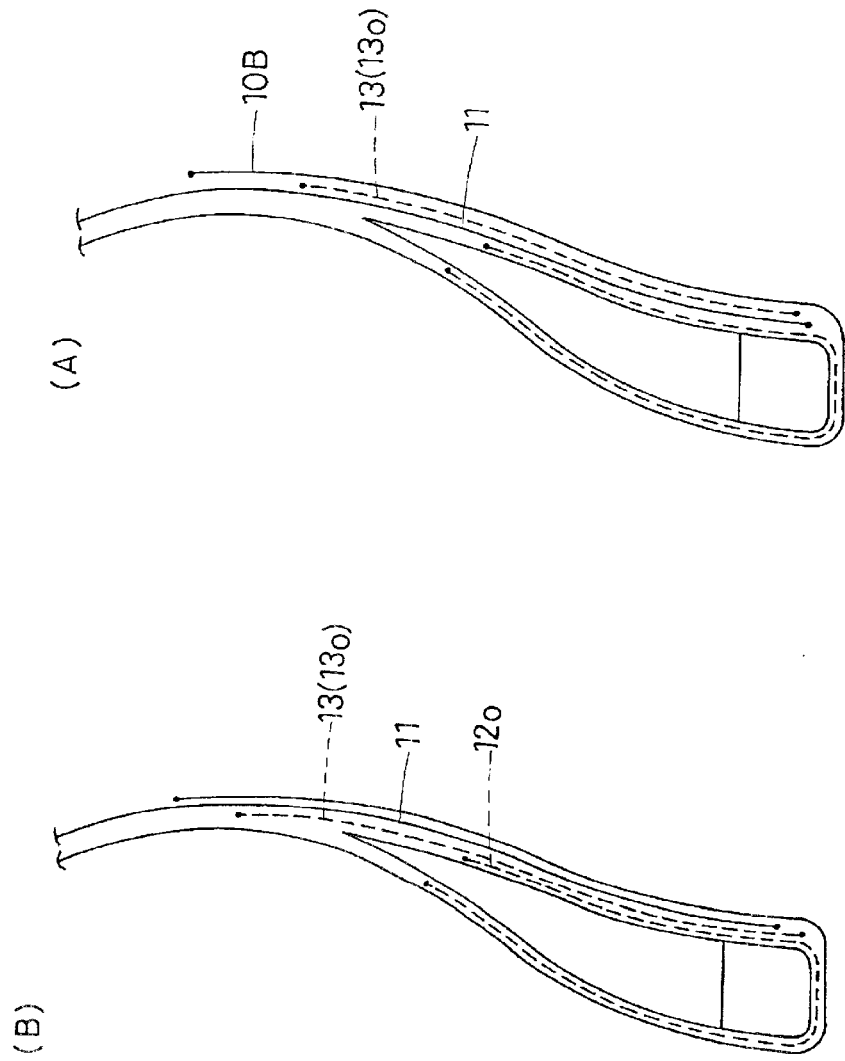

FIG. 5(A) and FIG. 5(B) are sectional views illustrating still another embodiment of the second bead reinforcing layer.

Figure 6:
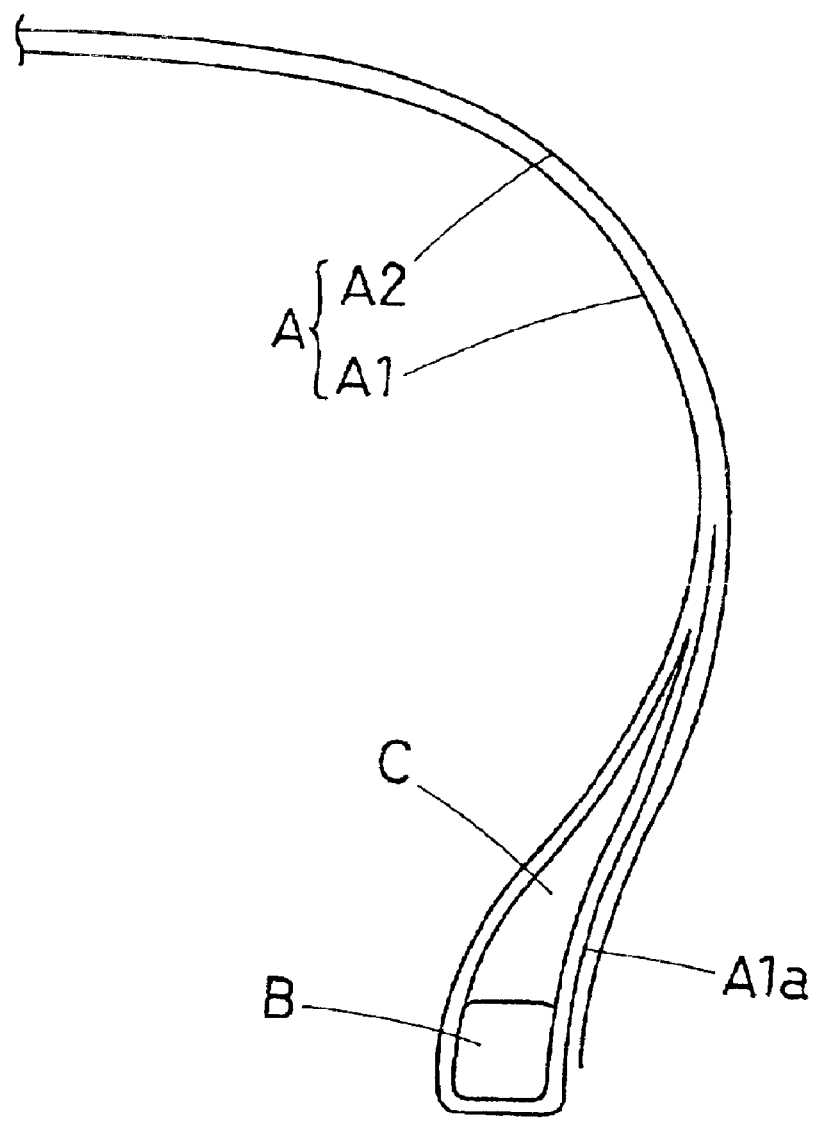

FIG. 6 is a sectional view for explaining a prior art.

DETAILED DESCRIPTION OF THE INVENTION

Embodiments of the present invention will now be explained with reference to the illustrated examples.

Figure 1:
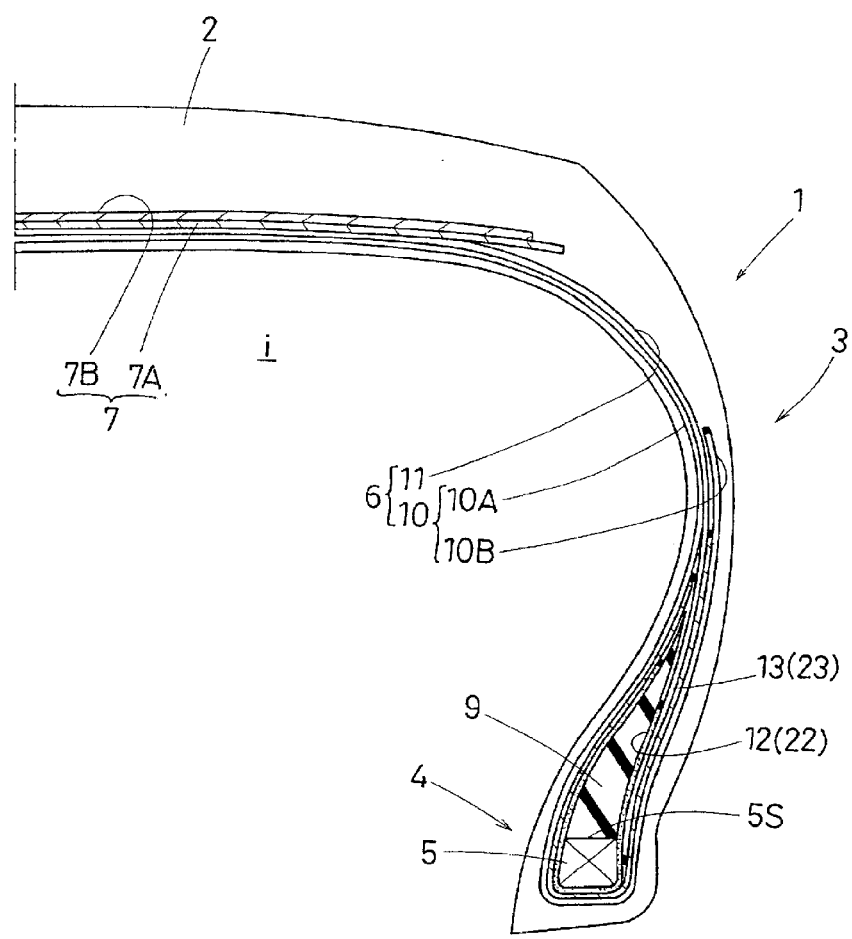
FIG. 1 is a sectional view of a tire according to one embodiment of the present invention.

FIG. 1 is a meridian sectional view of the pneumatic radial tire of the present invention, which is a high performance tire of a size of 225/45R16 for use in a passenger car.

In FIG. 1, the pneumatic radial tire 1 (hereinafter referred to as "tire 1") includes a tread portion 2, a pair of side wall portions 3 inwardly extending radially from both ends of the tread portion 2, and bead portions 4 located at inner ends of the respective side wall portions 3. The tire 1 is further provided with a carcass 6 extending to bridge over the bead portions 4, 4 and a belt layer 7 that is disposed inward of the tread portion 2 and outside of the carcass 6 in a radial direction.

The carcass 6 has a 1—1 structure consisting of an inner carcass ply 10 disposed on inner side i facing an tire inner space and an outer carcass ply 11 disposed outside thereof.

More particularly, the inner carcass ply 10 is arranged in that a ply fold-up portion 10B, which is fold up from inside to outside of the tire around the bead core 5, is integrally formed with a ply main body portion 10A that extends from the tread portion 2 over the side wall portions 3 to the bead cores 5 of the bead portions 4. A bead apex rubber 9 is provided between the ply main body portion 10A and the ply fold-up portion 10B to outwardly extend in a radial direction in a tapered manner from an upper surface 5S of the bead core 5. The bead apex rubber 9 might suitably be formed of hard rubber having a durometer A hardness of 80 to 96 degrees, similar to the prior art, for reinforcing regions extending from the bead portions 4 to the side wall portions 3.

The outer carcass ply 11 extends inwardly in a radial direction from the tread portion 2 over the side wall portions 3 and is rolled down between the bead apex rubber 9 and the ply fold-up portion 10B to be engaged thereat.

An inner end of the outer carcass ply 11 in this preferred embodiment terminates in a height region between the upper surface 5S and the bottom surface of the bead core 5, and a fold-up end of the inner carcass ply 10 (outer end of the ply fold-up portion 11B) terminates in a height region between a maximum width position P of the tire and a tread end.

The inner and outer carcass plies 10, 11 include carcass cords respectively arranged at angles of 70 to 90 degrees with respect to a peripheral direction of the tire, and suitable materials that might be employed for such carcass cords are organic fiber cords such as those made of nylon, polyester, rayon or aromatic polyamide.

The belt layer 7 consists of two or more of highly elastic belt cords such as aromatic polyamide fiber cords or steel cords that are arranged at angles of 10 to 35 with respect to a peripheral direction of the tire, and in this embodiment, of two inner and outer belt plies 7A, 7B. The belt cords are disposed at different directions of arrangements such that they intersect between the plies and thereby to reinforce the tread portion 2 and to improve its tread rigidity substantially over its entire width owing to the strong hoop effects. It is preferable to form a band layer (not shown) further outside of the belt layer 7 in which organic fiber cords such as those made of nylon are, for instance, spirally wound at an angle of 5 degrees or less with respect to a peripheral direction of the tire for the purpose of preventing lifting of the tread portion 2 accompanying high speed running.

The bead portions 4 are equipped with first and second reinforcing layers 12, 13 for the purpose of restricting torsional deformation of the bead portions 4.

The first bead reinforcing layer 12 is formed of a single reinforcing ply 22 having reinforcing cords inclining at cord angles of 15 to 60 degrees with respect to a peripheral direction of the tire, wherein the reinforcing ply 22 may be made of a fabric material in which the reinforcing cords are used as warps that are arranged to be parallel to each other, or of a textile material in which the reinforcing cords are used as warps/wefts that are woven in a lattice-like shape. As for the textile material, at least one group of the reinforcing cords (warps or wefts) should be disposed at an angle within the above range (15 to 60 degrees). While the reinforcing cords may be organic fiber cords or steel cords, suitably used organic fiber cords are those of nylon or aromatic polyamide wherein the latter is more suitable.

Figure 2:
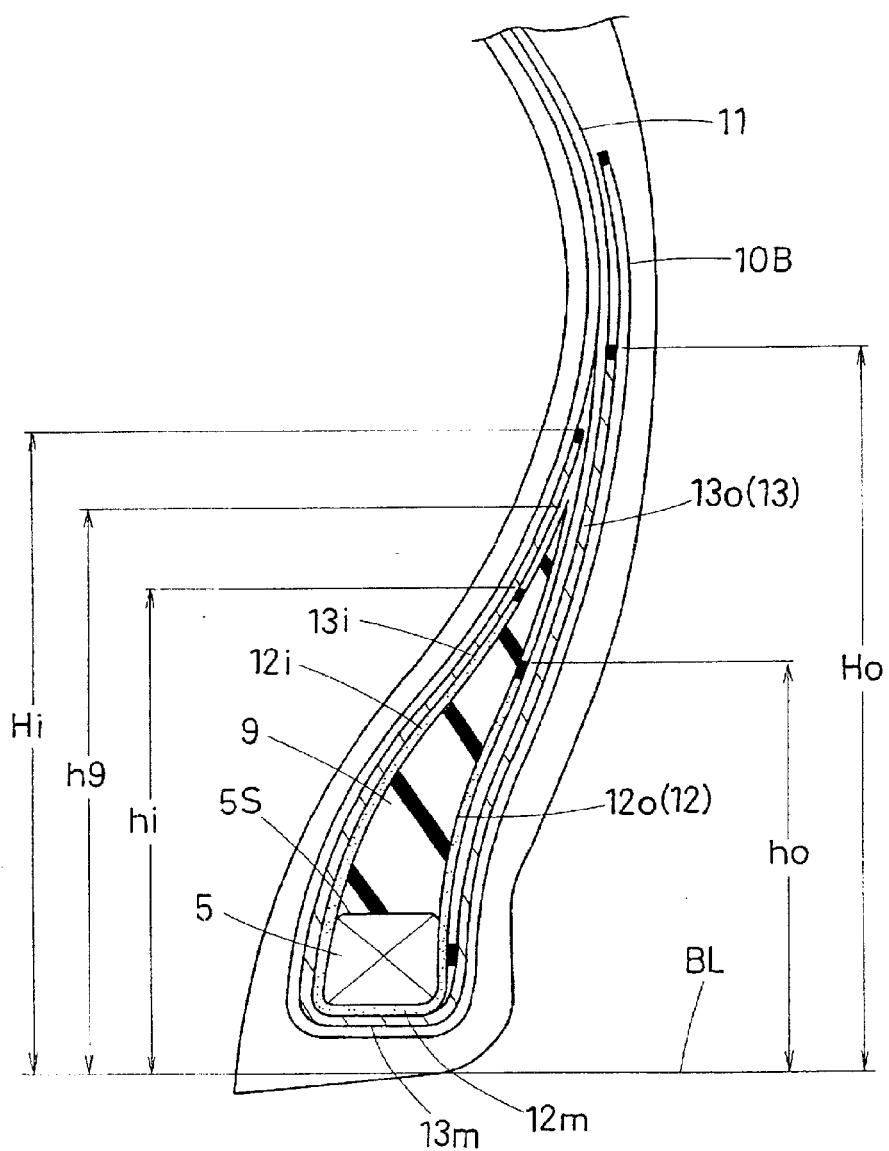
FIG. 2 is a sectional view in which a bead portion thereof is illustrated in an enlarged manner.

As illustrated in FIG. 2 in an enlarged form, the first bead reinforcing layer 12 is formed such a U-letter shape wherein an inner turn up portion 12i adjoining an inner surface of the bead apex rubber 9 and an outer turn up portion 12o adjoining an outer surface of the bead apex rubber 9, are provided and connected to both sides of a base portion 12m extending through the bottom surface of the bead core 5. More particularly, the first bead reinforcing layer 12 enwraps the bead core 5 and the bead apex layer 9 in a closely fitted manner for firmly bonding both members in an integral manner. In the embodiment, a height hi from a base bead line BL at an outer end of the inner turn up portion 12i in a radial direction is smaller than a height h9 of an outer end of the bead apex rubber 9 but larger than a height ho of an outer end of the outer turn up portion 12o, that is, in which h9>hi>ho is satisfied. The "bead base line BL" is a line parallel to a tire axis passing through an intersection of the extension of a bead bottom surface and a bead outer surface of the tire and indicates a nominal rim diameter.

The second bead reinforcing layer 13 is similarly formed of a single reinforcing ply 23 including reinforcing cords inclining at cord angles of 15 to 60 degrees with respect to a peripheral direction of the tire. In this reinforcing ply 23, the reinforcing cords are disposed at different cord angles or directions of inclination such that they intersect with the reinforcing cords of the reinforcing ply 22. Therefore, a firm truss structure is formed by the respectively intersecting reinforcing cords in cooperation with the carcass cords at regions where the reinforcing plies 22, 23 overlap to thus exhibit strong torsion rigidity, and possible to effectively restrict torsional deformation of the bead core 5. For achieving a firm truss structure, it is preferable to vary the directions of inclination of the reinforcing cords.

In case the respective cord angles in the reinforcing plies 22, 23 are less than 15 degrees, molding inferiority will be caused in the tire by the shaping deficiencies of plies 22, 23. In case these angles exceed 60 degrees, the rigidity will fall short so that it will become difficult to effectively restrict deformation owing to torsion. The range is preferable from 45 to 55 degrees, and an angle of intersection of the cords is preferable from 50 to 90 degrees.

The reinforcing ply 23 may be made of a fabric material in which the respective reinforcing cords are used as warps and are arranged to be parallel to each other, or of a textile material in which the reinforcing cords are used as warps/wefts and are woven in a lattice-like shape, wherein in case of employing a textile material, at least one group of the reinforcing cords shall be disposed at an angle within the above range (15 to 60 degrees). While the reinforcing cords may be organic fiber cords or steel cords, suitably used organic fiber cords are those of nylon or aromatic polyamide wherein the latter is particularly suitable.

Since the second bead reinforcing layer 13 has an outer piece portion 13o which extends from a position beyond the outer end of the outer turn up portion 12o to exceed inwardly the upper surface 5S of the bead core 5 to inside in the radial direction, it overlaps with the outer turn up portion 12o outwardly in an axial direction of the tire.

This overlapping region at least outside of the bead apex rubber 9 in an axial direction of the tire and covering the outer end of the outer turn up portion 12o of the U-shaped first bead reinforcing layer 12 enwrapping the bead core 5 by the outer piece portion 13o is both effective in restricting torsional deformation of the bead portions 4.

In the embodiment, the second bead reinforcing layer 13 is shaped in U-letter form in which the outer piece portion 13o is extended to the base piece portion 13m and the inner piece portion 13i that respectively overlap the base portion 12m and the inner turn up portion 12i. The heights Hi, Ho of the respective outer ends of the inner piece portion 13i and the outer piece portion 13o from the bead base line BL are set such that that they are at least larger than the heights hi, ho, that is, that Hi>hi and Ho>ho is satisfied, so that the second bead reinforcing layer 13 will further cover the first bead reinforcing layer 12 in an enwrapping manner. In the embodiment, it is arranged to satisfy Hi>h9>hi, Ho>h9>ho.

By forming both bead reinforcing layers 12, 13 to be in a U-shaped form, it is possible to increase overlapping regions and since these regions successively enclose substantially the entire periphery of the bead core 5 and the bead apex rubber 9, and to further improve effects of restricting torsional deformation.

Figure 3:
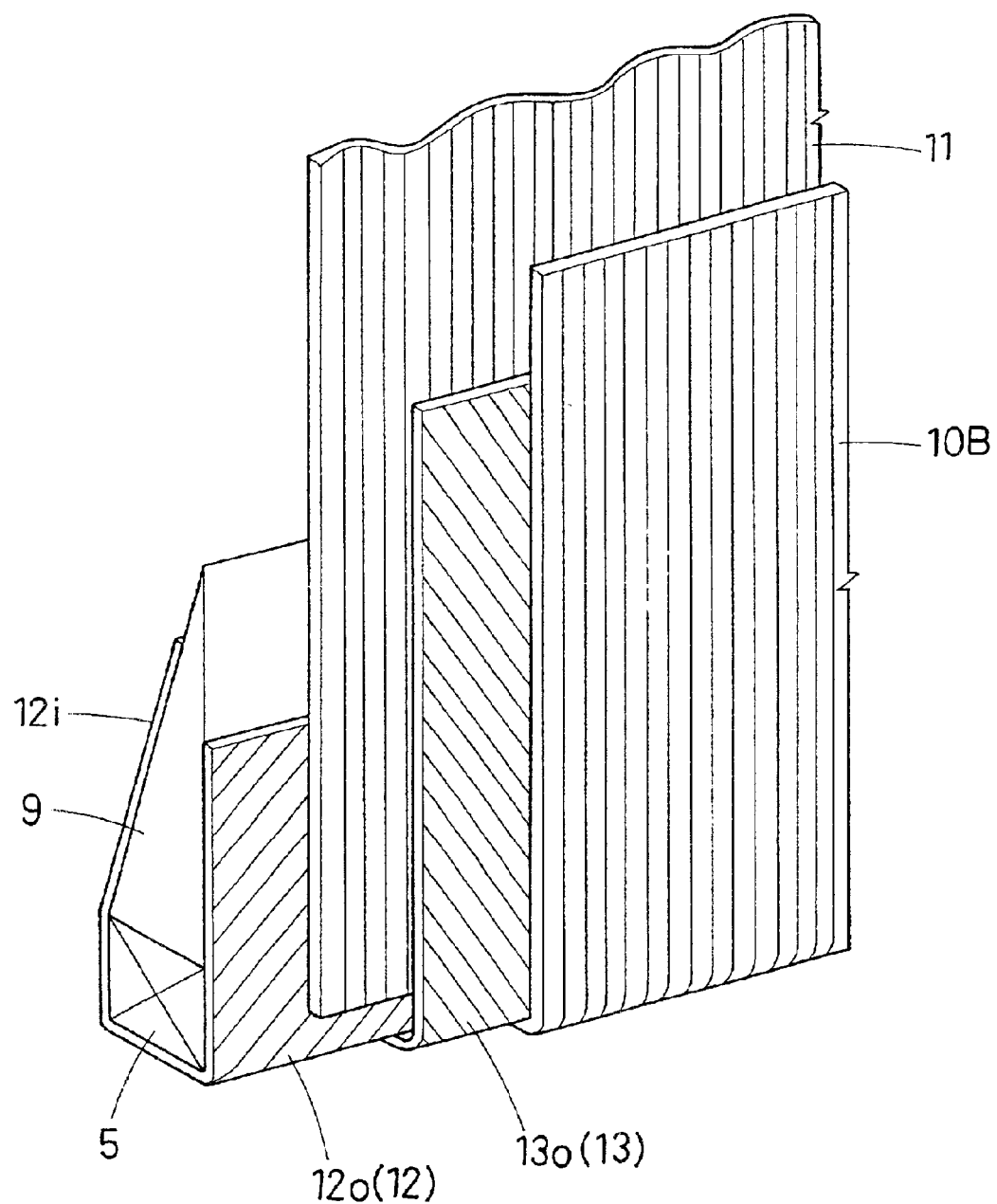
FIG. 3 is a perspective view for schematically showing a cord arrangement of the bead portions.

As shown in FIG. 2, the outer piece portion 13o is interposed between the ply fold-up portion 10B and the outer carcass ply 11 such that four layers, namely the outer turn up portion 12o, the outer carcass ply 11, the outer piece portion 13o and the ply fold-up portion 10B are sequentially overlaid from inside to outside in an axial direction of the tire. As the result, it is possible to form an even stronger truss structure between each of the inwardly and outwardly adjoining layers in which the cords are arranged to intersect with each other as schematically illustrated in FIG. 3 and is thus more preferable in view of restricting torsional deformation. Additionally, since the outer carcass ply 11 relieves the shearing force between the outer turn up portion 12o and the outer piece portion 13o, it is possible to ease stress concentration at ends of the cords and thus to maintains the durability of the tire.

Figure 4:
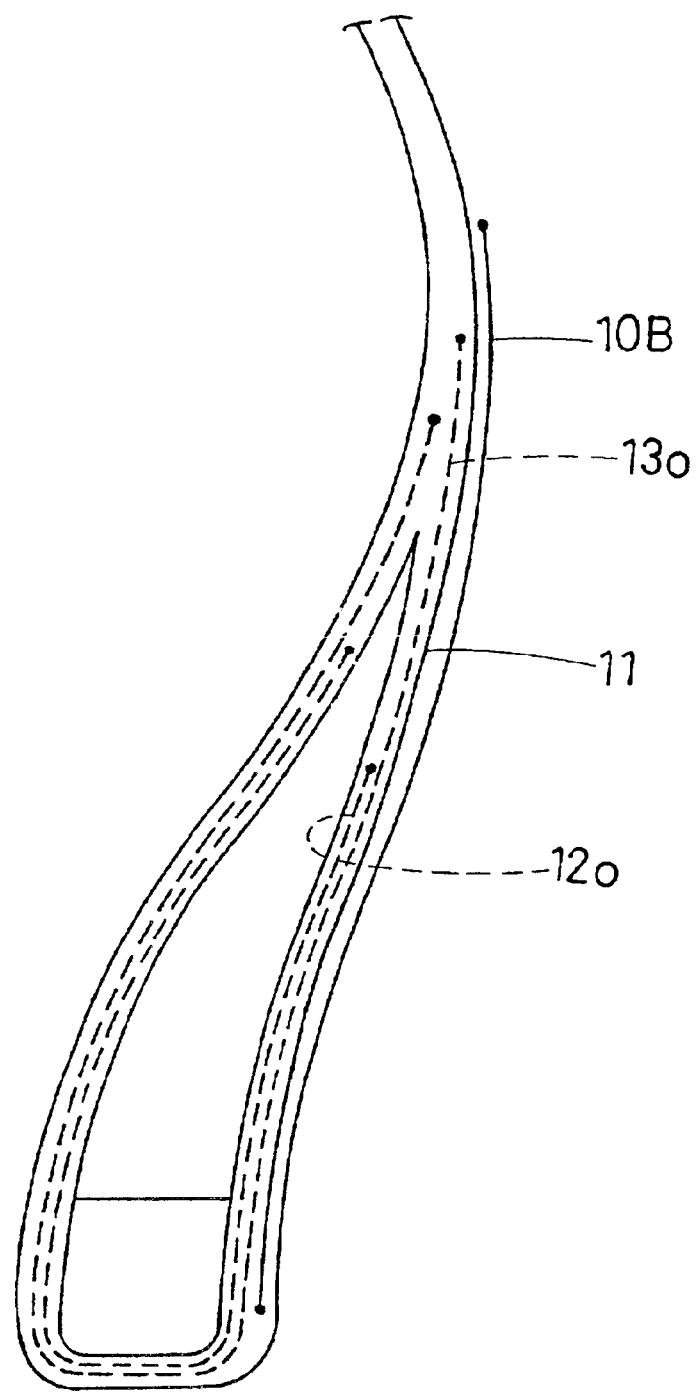
FIG. 4 is a sectional view illustrating another embodiment of the second bead reinforcing layer.

In the embodiment shown in FIG. 4, the outer piece portion 13o might also be interposed between the outer turn up portion 12o and the outer carcass ply 11, while such an arrangement is somewhat inferior as a truss structure than the former one since the cords will not intersect between the adjoining outer carcass ply 11 and the ply fold-up portion 10B.

Another embodiments shown in FIGS. 5(A) and 5(B), each of the second bead reinforcing layer 13 consists of the outer piece portion 13o only. In case of FIG. 5(A), the outer piece portion 13o is interposed between the ply fold-up portion 10B and the outer carcass ply 11, and in case of FIG. 5(B), the outer piece portion 13o is interposed between the outer turn up portion 12o and the outer carcass ply 11.

The reinforcing cords employed in the reinforcing plies 22, 23 shall have a diameter of 0.4 to 0.7 mm in case they are steel cords; in case they are aromatic polyamide fiber cords, those having a size of 1,100 to 1,800 dtex may be suitable employed.

Prototypes of a high performance passenger car tire of size of 225/45R16 shown in FIG. 1 were manufactured according to the specifications of Table 1, and initial response characteristics of the respective prototype tires at steering were compared depending on running time on a circuit. The tires are of identical specifications except the points listed in Table 1.

Prototype tires were attached to all wheels of a vehicle (2,000 cc: FR vehicle) with conditions for a rim being 7.5 J×16 and for an internal pressure 250 kPa, wherein a time trial was made on a circuit course (paved road) for measuring a running time thereof.

said bead portions are provided with a U-shaped first bead reinforcing layer which comprises a single reinforcing ply having reinforcing cords inclining at angles between 15 to 60 degrees with respect to a peripheral direction of the tire, and is employed to form an inner roll up portion and an outer roll up portion that are adjoining inner and outer side faces of said bead apex rubber on both side ends of a base portion extending through a bottom surface of said bead core, and a second bead reinforcing layer which comprises a single

TABLE 1

| | Comparetive Example | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|---|
| Carcass structure | 1–1 | 1–1 | 1–1 | 1–1 | 1–1 | 1–1 | 1–1 | 1–1 | 1–1 |
| Bead structure- | — | FIG. 1 | FIG. 5(A) | FIG. 5(B) | FIG. 4 | FIG. 1 | FIG. 1 | FIG. 1 | FIG. 5(A) |
| First bead reinforcing layer | Provided | Provided | Provided | Provided | Provided | Provided | Provided | Provided | Provided |
| type of ply | Fabric | Fabric | Fabric | Fabric | Fabric | Fabric | Fabric | Fabric | Fabric |
| reinforcing cord | Aromatic polyamide (1670 dtex) | Aromatic polyamide (1670 dtex) | Aromatic polyamide (1670 dtex) | Aromatic polyamide (1670 dtex) | Aromatic polyamide (1670 dtex) | Aromatic polyamide (1670 dtex) | Aromatic polyamide (1670 dtex) | Aromatic polyamide (1670 dtex) | Aromatic polyanide (1670 dtex) |
| cord angle <degree> | 50 | 50 | 50 | 50 | 50 | 15 | 60 | 50 | 50 |
| cord count (number/5 cm)- | 35 | 35 | 35 | 35 | 35 | 35 | 35 | 35 | 35 |
| second reinforcing layer | Not provided | Provided | Provided | Provided | Provided | Provided | Provided | Provided | Provided |
| type of ply | — | Fabric | Fabric | Fabric | Fabric | Fabric | Fabric | Textile material | Textile material |
| reinforcing cord | — | Aromatic polyamide (1670 dtex) | Aromatic polyamide (1670 dtex) | Aromatic polyamide (1670 dtex) | Aromatic polyamide (1670 dtex) | Aromatic polyamide (1670 dtex) | Aromatic polyamide (1670 dtex) | 6 nylon (490 dtex) mono | 6 nylon (490 dtex) mono |
| cord angle <degree> | — | 50 | 50 | 50 | 50 | 15 | 60 | 45 | 45 |
| cord count (number/5 cm) | — | 35 | 35 | 35 | 35 | 35 | 35 | 38 | 38 |
| running time | 1'37"62 | 1'33"84 | 1'36"36 | 1'36"58 | 1'34"02 | 1'34"23 | 1'36"58 | 1'33"85 | 1'36"38 |

As it can be understood from the Table, the tire of the embodiments in which especially the second bead reinforcing layer is in a U-shaped while matching with a carcass of 1—1 structure was capable of restricting torsional deformation of bead portions and of achieving improvements in initial response characteristics of steering so that the running time was shortened.

While embodiments of the present invention have been described above, the present invention is not limited to the illustrated embodiments but may be embodied upon modification into various forms in the scope of the invention.

What is claimed is:

1. A pneumatic radial tire comprising a carcass extending to bridge over a bead core of bead portions, a belt layer disposed inside of a tread portion and outside of said carcass in a radial direction thereof, and a bead apex rubber extending outwardly from an upper surface of said bead cores in a radial direction of said tire, wherein said carcass includes an inner carcass ply in which a ply main body portion that extends from the tread portion over side wall portions to the bead core of the bead portions is integrally provided with and connected to a ply fold-up portion, which is folded up around said bead core from inside to outside in an axial direction of the tire, and an outer carcass ply that passes outside of the inner carcass ply to extend from the tread portion over the side wall portions to a portion between said bead apex rubber and said ply fold-up portion, and reinforcing ply having reinforcing cords having angles of directions different from those of said first bead reinforcing layer and is employed to form at least an outer piece portion that extends inward in a radial direction to exceed said upper surface of said bead cores from an outer end of said outer roll up portion in a radial direction and that outwardly overlaps onto said outer roll up portion in an axial direction of the tire, wherein said second bead reinforcing layer is arranged in that said outer piece portion thereof is interposed between said ply fold-up portion and said outer carcass ply.

2. The pneumatic radial tire according to claim 1, wherein said second bead reinforcing layer is U-shaped in which a base piece portion overlaps with said base portion of said first bead reinforcing layer and an inner piece portion overlaps with said inner roll up portion of said first bead reinforcing layer, said base piece portion and said inner piece portion being provided to extend from said outer piece portion.

3. The pneumatic radial tire according to claim 1 or 2, wherein said reinforcing ply of said second bead reinforcing layer is made of a fabric material in which reinforcing cords are arranged to be parallel to each other.

4. The pneumatic radial tire according to claim 1 or 2, wherein said reinforcing ply of said second bead reinforcing layer is made of a textile material in which the reinforcing cords are woven in a lattice-like shape.

* * * * *